United States Patent [19]

Nakazato et al.

[11] Patent Number: 5,715,500
[45] Date of Patent: Feb. 3, 1998

[54] IMAGE READING DEVICE HAVING AN AUTOMATIC DOCUMENT FEEDER WITH AT LEAST A REMOVABLE DOCUMENT FEEDING SECTION

[75] Inventors: Yasushi Nakazato, Tokyo; Shigeru Horiguchi, Kawasaki; Takashi Taruki, Hiratsuka; Masashi Kouchi, Tokyo; Makoto Tanaka, Kamakura; Hisayo Ohshita, Kawasaki, all of Japan

[73] Assignee: Ricoh Company, Ltd., Tokyo, Japan

[21] Appl. No.: 542,932

[22] Filed: Oct. 13, 1995

[30] Foreign Application Priority Data

Oct. 13, 1994 [JP] Japan ................................ 6-247892
Feb. 27, 1995 [JP] Japan ................................ 7-038486

[51] Int. Cl.[6] ........................... G03G 15/00; H04N 1/00
[52] U.S. Cl. ........................ 99/124; 399/367; 355/75; 358/496
[58] Field of Search .................. 355/202, 308, 355/309, 50, 51, 75, 313, 285; 358/496, 498, 401; 399/110, 118, 124, 367

[56] References Cited

FOREIGN PATENT DOCUMENTS

| | | |
|---|---|---|
| 57-73753 | 5/1982 | Japan . |
| 63-165231 | 7/1988 | Japan . |
| 4-184365 | 7/1992 | Japan . |
| 5-2738103 | 10/1993 | Japan ............................ 355/285 |
| WO 94/09589 | 4/1994 | WIPO . |

*Primary Examiner*—Joan H. Pendegrass
*Attorney, Agent, or Firm*—Oblon, Spivak, McClelland, Maier & Neustadt, P.C.

[57] ABSTRACT

In an image forming apparatus with an ADF (Automatic Document Feeder), a conveyor mechanism sequentially conveys documents from a document feeding section to a document collecting section by way of a slit for scanning the documents. The feeding section and collecting section are disposed one above the other. The ADF including the feeding section and collecting section can be bodily pulled out toward the operator away from a scanner including a CCD (Charge Coupled Device) image sensor, lens, and light source.

8 Claims, 15 Drawing Sheets

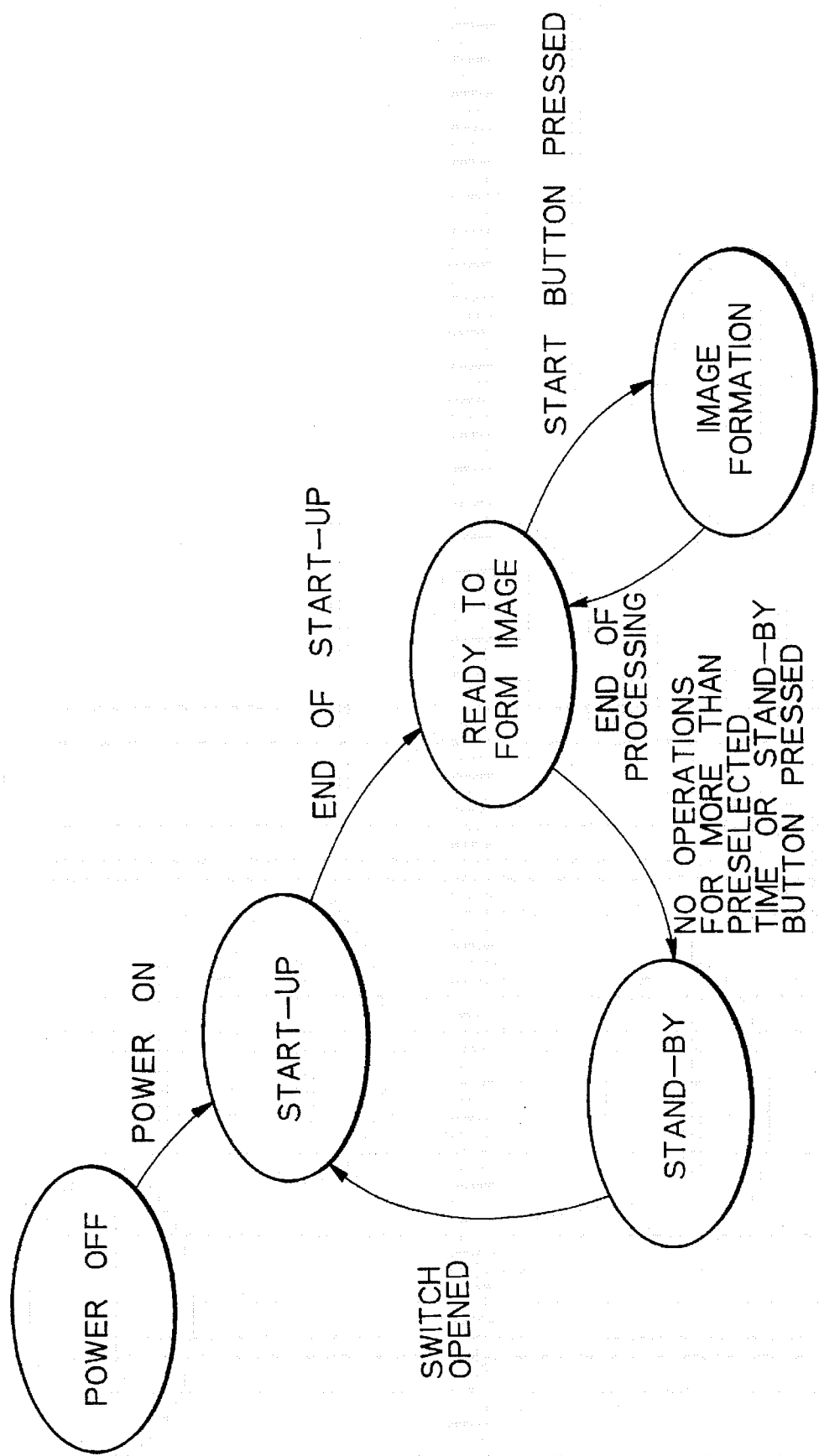

IMAGE READING DEVICE HAVING AN AUTOMATIC DOCUMENT FEEDER WITH AT LEAST A REMOVABLE DOCUMENT FEEDING SECTION

BACKGROUND OF THE INVENTION

The present invention relates to an image forming apparatus having an automatic document feeder (ADF) capable of sequentially feeding documents from a document feeding section to a scanning position, and for reading document images line by line while transforming them to corresponding image signals.

Today, many copiers of medium and large are sizes are loaded with an ADF having the above capability. Because the top of a glass platen, or document reading surface, is positioned on the top of a copier body for manipulability reasons, the ADF is positioned above the glass platen, i.e., on the top of the copier and hinged such that it is openable at the front of the copier body. The ADF must be selectively opened or closed depending on the desired document feed mode, i.e., automatic or manual, so that nothing can be arranged on the ADF. Moreover, because the copier has a copy tray protruding sideways therefrom, an exclusive space must be allocated to the copier including the copy tray. This prevents the space available around the copier from being efficiently used.

In light of the above, Japanese Patent Utility Model Laid-Open Publication No. 58-185854, for example, teaches a document stacker and a copy stacker positioned one above the other in the upper portion of an ADF. Japanese Utility Model Laid-Open Publication No. 56-108138 discloses an ADF having a cover on the top thereof and on which documents are stacked, and a document collecting section below the cover. Documents are fed from the top of the cover to the collecting section by way of a scanning position. Although these conventional schemes enhance the efficient use of the space available at the side of the copier, they give no consideration to the space above the copier.

A current trend in the imaging art is toward a digital copier capable of producing sharper images than an analog copier. Moreover, modern technologies have made it possible to implement the various functions of a digital copier as independent image processing units. This realizes a multiplex image forming system in which a document reading section and an image forming section are each usable for various purposes. Hence, taking the conventional scanner as the image reading device, the fact that the space above the ADF cannot be used at all limits the system arrangement.

There has been proposed an ADF disposed in a scanner and having a document feeding section which can be pulled out like the paper tray of a copier. With this kind of approach, however, it is likely that if the feeding section is accidentally pulled out when a document is being conveyed or in the event of a jam, the document caught by a conveying mechanism is damaged. It is extremely difficult to restore a damaged document. A document reading device which makes the user feel uneasy due to the possible damage to documents is critically low in commercial value.

Today, even a popular type of copier is operable in a stand-by mode for saving power while the copier is in a stand-by state. When the operator presses a preheat button, the stand-by mode is set up in which a heat roller included in a fixing device is held in a preheat condition, a motor for driving a polygonal mirror is deenergized, and a dynamic memory is inhibited from being updated. This, however, brings about the following problem. Assume a copier having a document feeding section which can be pulled out at the front of the copier, and operable in the above stand-by mode. Then, in the stand-by mode, when the operator stacks document on the feeding section and then presses the preheat button to cancel a preheat mode, a certain period of time is necessary for the heat roller to reach a preselected temperature and for the polygon motor to reach a preselected rotation speed. Such a period of time, if short, irritates the operator needing urgent copies.

SUMMARY OF THE INVENTION

It is, therefore, an object of the present invention to provide an image forming apparatus with an ADF and allowing a slidable document feeding section to be pulled out at the front of the apparatus while protecting a document being conveyed from damage when the feeding section is pulled out.

It is another object of the present invention to provide an image forming apparatus with an ADF an capable of obviating, when a stand-by mode is set up, an operation for cancelling the stand-by mode, and of eliminating or reducing a waiting time attributable to the start-up of the apparatus.

In accordance with the present invention, an image forming apparatus has a scanner for reading a document image line by line, and an ADF for causing a conveying mechanism to sequentially convey documents from a document feeding section to a document collecting section by way of a scanning position. The document feeding section, conveying mechanism, and document collecting section are disposed in the ADF and can be bodily pulled out at the front of the body of the ADF.

Also, in accordance with the present invention, an image forming apparatus has a scanner for reading a document image line by line, and an ADF for causing a conveying mechanism to sequentially convey documents from a document feeding section to a document collecting section by way of a scanning position. The document feeding section and conveying mechanism are disposed in the ADF and can be bodily pulled out at the front of the body of the ADF. The document collecting section is positioned at one side of the ADF in close proximity to an opening formed in that side of the ADF. No frame members are present at the front of the above-mentioned side of the ADF.

BRIEF DESCRIPTION OF THE DRAWINGS

The above and other objects, features and advantages of the present invention will become more apparent from the following detailed description taken with the accompanying drawings in which:

FIG. 24 demonstrates control over a digital copier.

In the figures, the same or similar constituent parts are designated by the same reference numerals.

DESCRIPTION OF THE PREFERRED EMBODIMENTS

Figure 1:
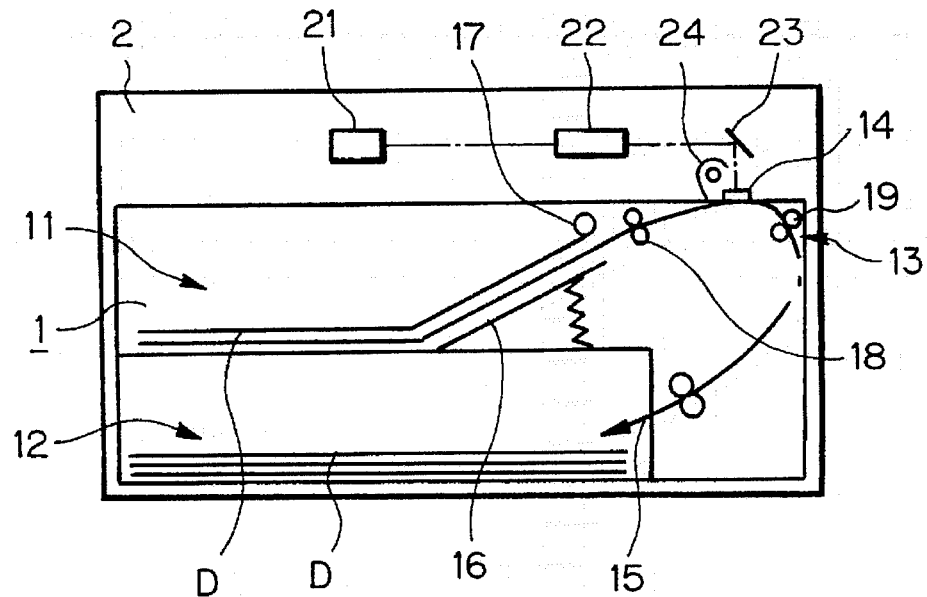
FIG. 1 shows an automatic document reading device having an ADF and representative of a first embodiment of the present invention.

Referring to FIG. 1 of the drawings, an automatic document reading device with an ADF and representative of a first embodiment of the present invention is shown. As shown, the device has an ADF 1 and an image scanning device or scanner 2. The ADF 1 has a section 11 to be loaded with a stack of documents D to be read by the scanner 2, and a section 12 for collecting the documents D sequentially read by the scanner 2. A conveyor mechanism 13 sequentially conveys the documents D out of the section 11 and then conveys them into the section 12 after they have been read by the scanner 2. A slit 14 extends in the direction perpendicular to the sheet surface of FIG. 1 and guides an imagewise reflection from the document D being conveyed by the mechanism 13 into the scanner 2. The document D read by the scanner 2 is introduced into the section 12 via an inlet 15. A presser plate 16 is pivotally connected to the bottom of the section 11 at one end and constantly biased upward by a spring at the other end. A pick-up roller 17 picks up the uppermost document D. A roller pair 18 serves to prevent two or more documents D from being fed at the same time. The reference numeral 19 designates a conveyor roller pair.

The scanner 2 has a solid-state imaging device or CCD (Charge Coupled Device) image sensor for transforming imagewise light incident thereto to an image signal. A lens 22 focuses the imagewise light onto the image sensor 21. A mirror 23 steers the reflection from the document incident thereto perpendicularly upward via the slit 14 in the horizontal direction. A light source 24 illuminates the surface of the document D being conveyed by the roller pair 18 via the slit 14.

The ADF 1 can be bodily pulled out at the front of the device away from the scanner 2 in the direction perpendicular to the sheet surface of FIG. 1. To load the ADF 1 with the documents D, it is pulled out by hand before the operation of the scanner 2. As a result, the section 11 above the section 12 is exposed to the outside and allows the document D to be stacked thereon. The conveyor mechanism 13 is similar in construction to a paper feed mechanism customarily included in a copier. Specifically, the presser plate 16 biased by the spring pushes the leading edge of the document stack D upward into contact with the pick-up roller 17. In this condition, the pick-up roller 17 feeds the uppermost document D out of the section 11 while the roller pair 18 separates the underlying documents D from the uppermost document D. The roller pair 18 drives, at a predetermined timing, the uppermost document D toward a scanning position where the document D will contact the slit 14. The document D read by the scanner 2 at the scanning position is collected in the section 12 via the inlet 15 by the roller pair 19.

In the scanner 2, when the light source 24 illuminates the document D, the resulting reflection from the document D is sequentially incident to and reflected by the mirror 23 via the slit 14 along the subscanning direction. The light from the mirror 23 is focused in the horizontal direction by the lens 22 and incident to the image sensor 21. The image sensor 21 transforms the incident light to a line-by-line image signal.

Figure 5:
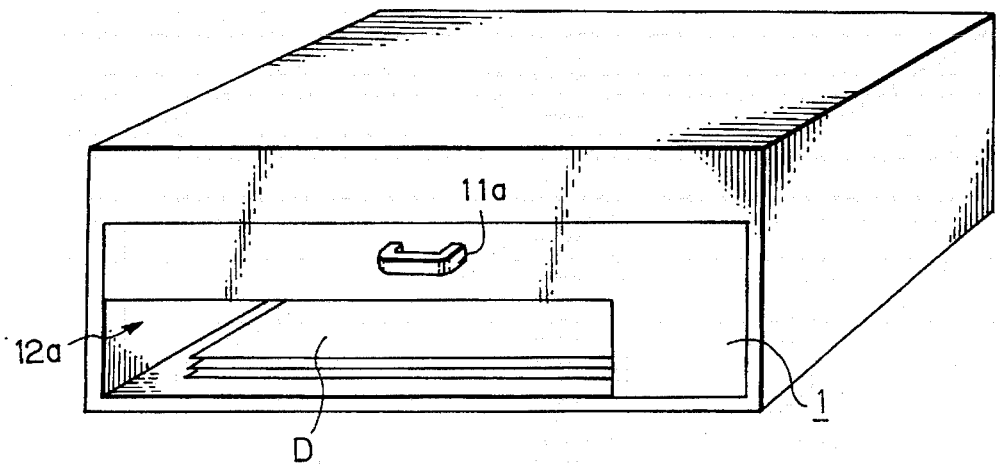
FIG. 5 is an external perspective view of the document reading device.

As shown in FIG. 5, the scanning device has an opening 12a in front of the document collecting section 12. The opening 12a allows the operator to see the documents D sequentially stacked on the section 12 through the opening 12a. However, the opening 12a is not high enough for the operator to remove the documents D by inserting fingers into the section 12. The illustrative embodiment further includes a mechanism for pushing the documents D forward out of the section 12. It is to be noted that a handle 11a is provided on the ADF 1 for allowing the operator to pull it out forward, i.e., toward the operator.

Figure 2:
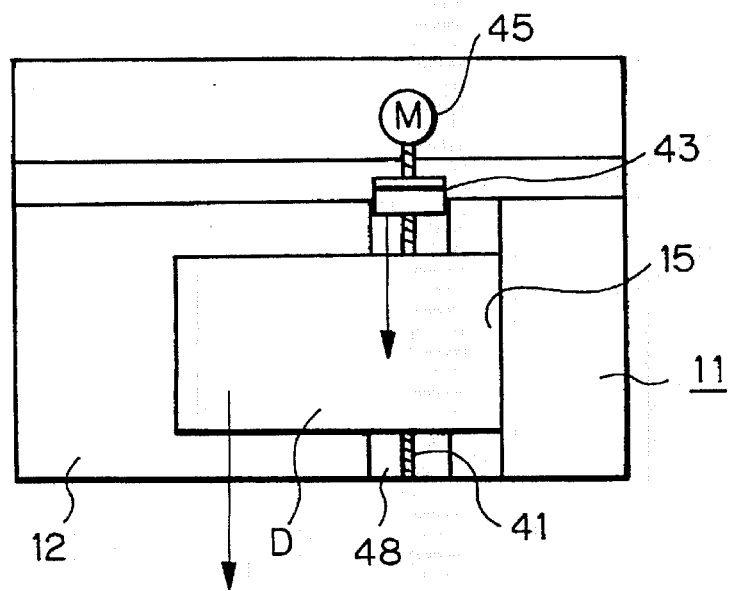
FIG. 2 is a plan view of a mechanism included in the document reading device and for pushing out documents.
Figure 3:
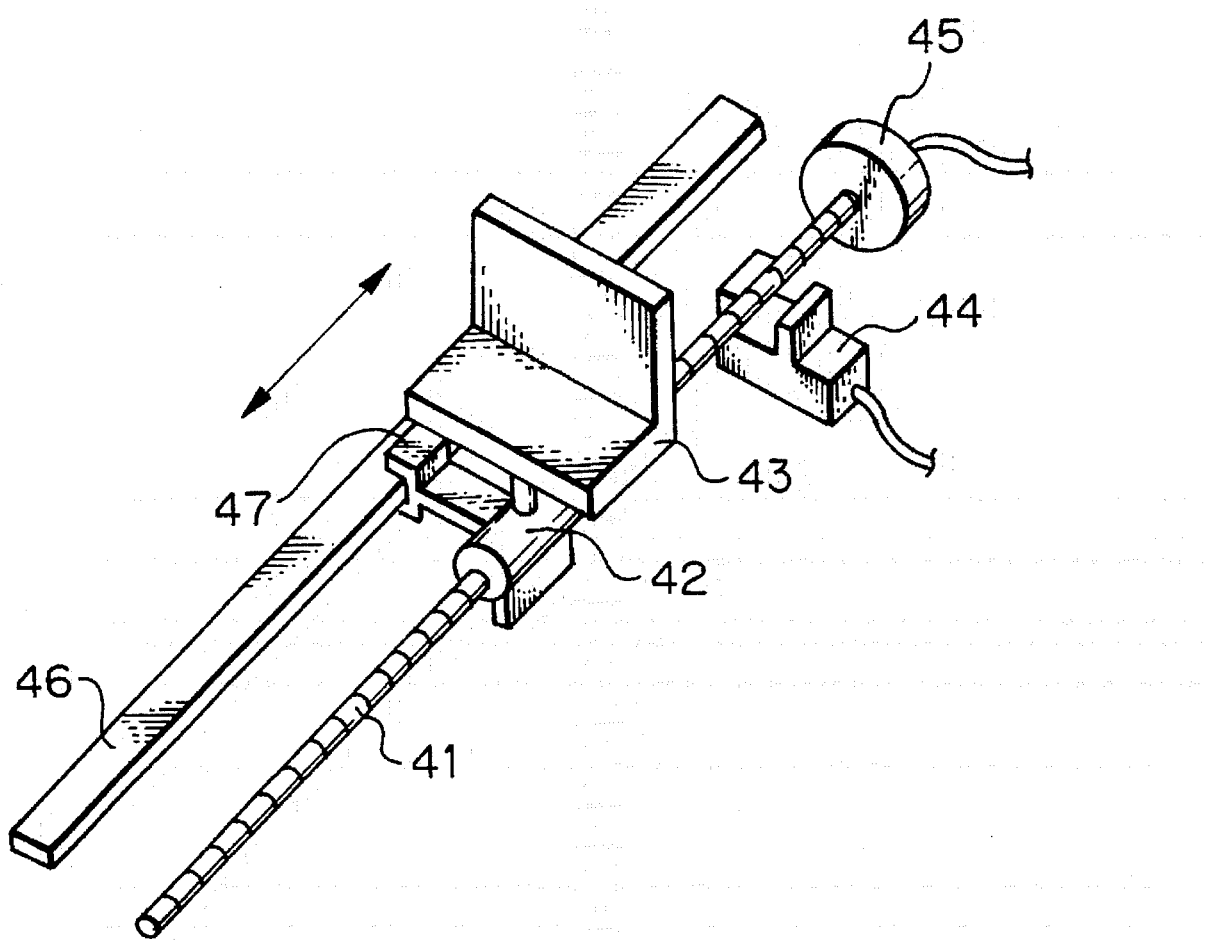
FIG. 3 is a plan view of the mechanism shown in FIG. 2.
Figure 4:
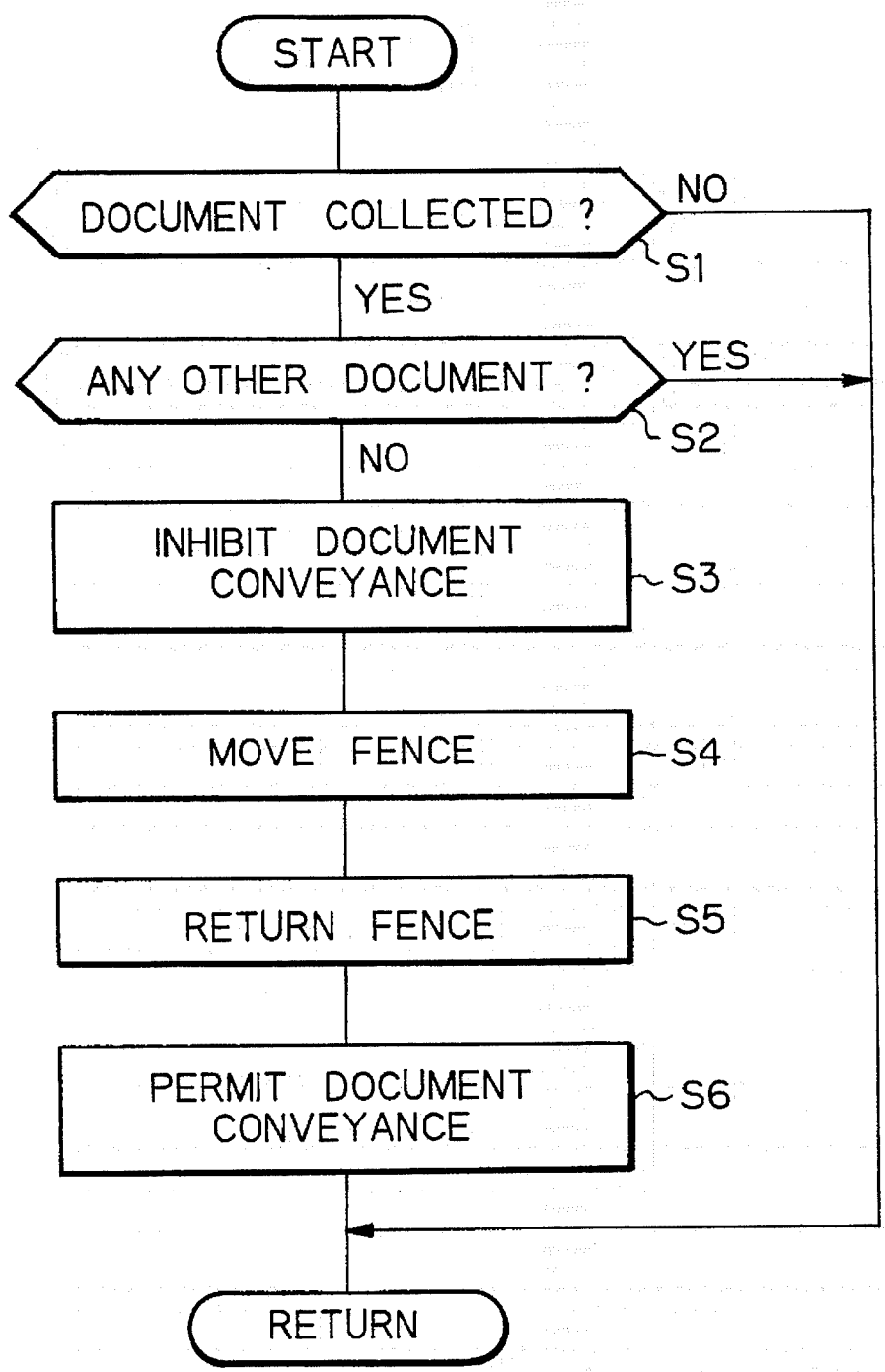
FIG. 4 is a flowchart demonstrating the operation of the mechanism shown in FIG. 2.

As shown in FIGS. 2 and 3, the push-out mechanism mentioned above has a rotatable screw shaft 41 positioned in the lower portion of the section 12 and adjoining the inlet 15. The screw shaft 41 extends in the front-and-rear direction of the section 12. A movable nut 42 is held in threaded engagement with the screw shaft 43. A fence 41 is mounted on the top of the nut 42 such that when the screw shaft 41 is rotated, it pushes the rear edge of the document stack D forward with its front end. A home position sensor 44 is responsive to the home position or stand-by position of the nut 42. A stepping motor 45 has its output shaft directly connected to the screw shaft 41. A guide bar 46 guides the nut 42 in the front-and-rear direction while preventing it from rotating about the screw shaft 41. An engaging piece 47 extends from the nut 42 substantially perpendicularly to the fence 43. The guide bar 46 is movably received in a recess formed in the engaging member 47, so that the fence 43 is held in a horizontal position. A slot 48 is formed in the bottom of the section 12 in the vicinity of the outlet 15 and above the screw shaft 41 in order to allow the fence 43 to move in the above direction. The operation of the push-out mechanism will be described with reference to FIG. 4.

As shown, when a document D is driven into the section 12 (Yes, step S1), whether or not another document D to be conveyed into the section 12 is present is determined (step S2). If the answer of the step S2 is negative (No), meaning that all the documents D have been collected in the section 12, the conveying operation is inhibited, and the document scanning operation is ended (step S3). In the stand-by condition, the fence 43 is held in a position where the sensor 44 senses the nut 42. In a step S4 following the step S3, the stepping motor 45 rotates a predetermined number of steps with the result that the nut 42 and fence 43 are moved a predetermined distance forward via the screw shaft 41, while pushing the rear edge of the document stack (step S4).

Subsequently, the motor 45 is reversed to return the fence 43 to the stand-by or home position (step S5). Then, conveyance of documents D is again permitted (step S6). In this manner, because it is difficult for the operator to see documents D collected in the section 12 through the opening the 12a, the embodiment causes the fence 43 to drive the documents D out of the section 12 immediately after all the documents have been read. This is done only once without regard to the number of documents D and at a speed not relating to the speed at which the documents D are introduced into the section 12. Hence, the push-out mechanism should only be operated a minimum of number of times in total and suffers from a minimum of deterioration.

Figure 6:
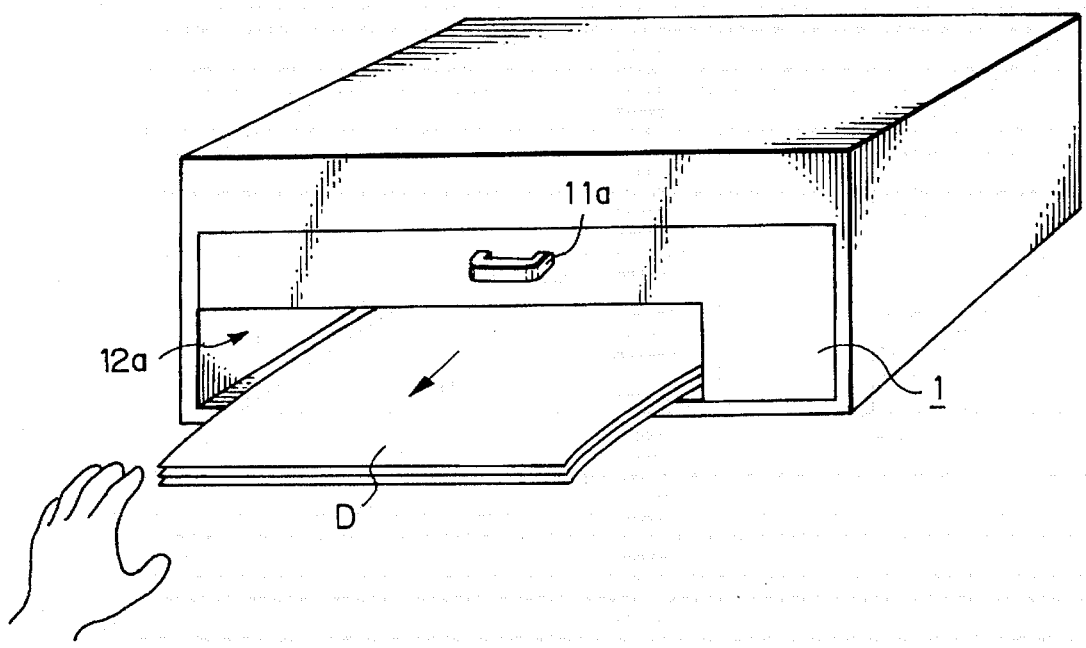
FIG. 6 is an external view showing one edge portion of a document stack driven out by the mechanism shown in FIG. 2.

FIG. 6 shows one edge portion of the document stack D driven out of the section 12 by the push-out mechanism. As shown, the document stack D is driven out of the section 12 immediately after all the documents D have been read. In this condition, the operator can see that all the documents D have been collected in the section 12, i.e., that the document reading operation has ended, and then easily remove the documents D from the section 12 by holding the edge portion of the stack. Because the slot 48 and, therefore, the position where the fence 43 adjoins the inlet 15 of the bottom of the section 12, the fence 43 can move the documents D forward out of the section 12 without regard to the document length in the front-and-rear direction. The inlet 15 is formed in the upper portion of one side wall of the section 12, so that the document coming in through the inlet 15 is prevented from being caught and bent by the slot 48.

Figure 8:
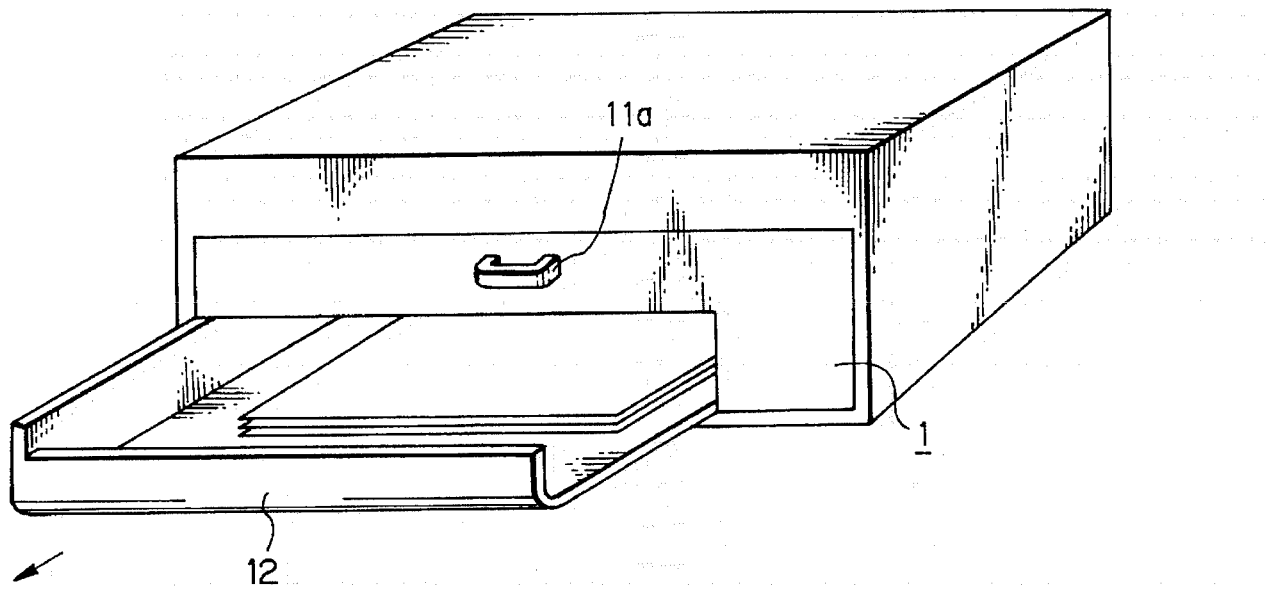
FIG. 8 is an external perspective view showing a modification of the first embodiment.
Figure 9:
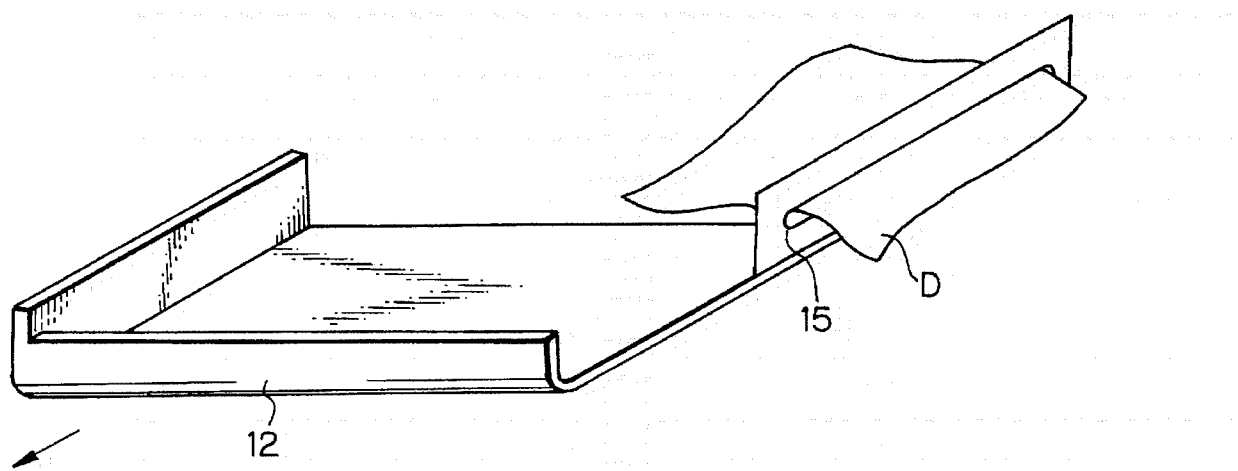
FIG. 9 is an external perspective view showing the modification in a particular condition.
Figure 10:
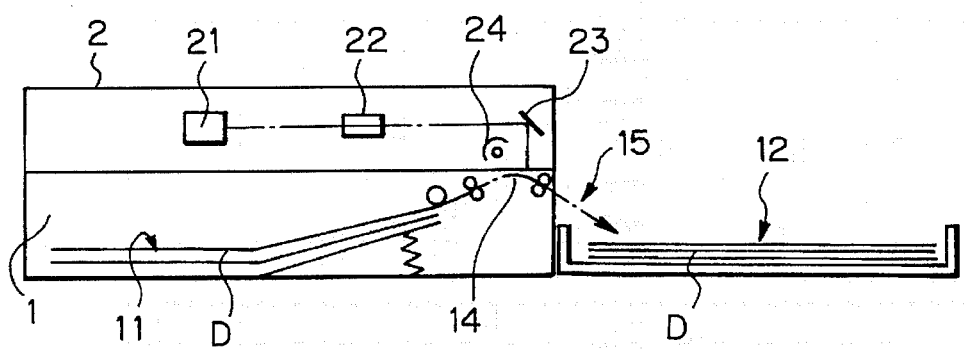
FIG. 10 is a sectional side elevation showing a third embodiment of the present invention.
Figure 16:
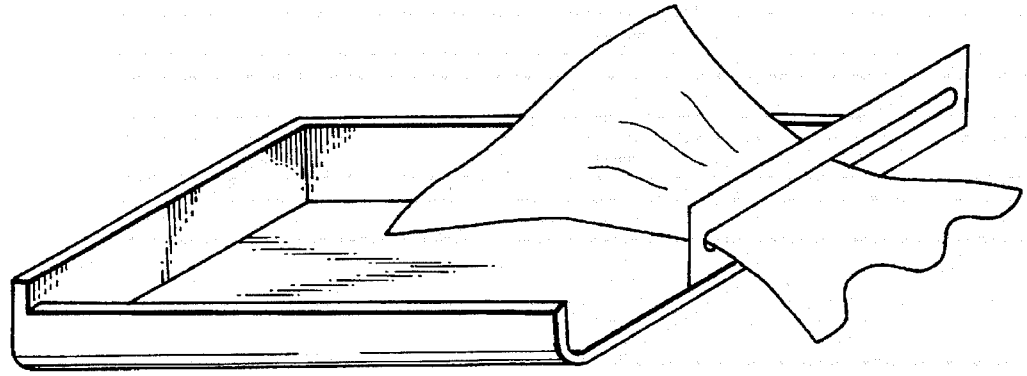
FIG. 16 shows a drawback to occur when the document outlet of the modification of the first embodiment is provided with a rear wall.

FIGS. 8 and 9 show a modification of the above embodiment. As shown, the modification has the section 12 which is implemented as a simple tray lacking the push-out mechanism. As shown in FIG. 9, the section 12 is not provided with a rear wall. Assume that the section 12 is implemented as a box having a rear wall, as shown in FIG. 16, and that the box is accidentally pulled out when the document D is being driven into the box. Then, it is likely that the document D abuts against and is damaged by the rear wall of the box. The modification of FIGS. 8 and 9 is free from this problem. The rest of the construction is identical with the first embodiment. If desired, the section 12 may be provided with a rear wall low enough for the document D coming in through the inlet 15 not to contact it.

As stated above, the embodiment and its modification each has the document feeding section 11, document collecting section 12, and conveyor mechanism 13 in the ADF 1. Hence, spaces above and at the side of the device can be effectively used, so that the space to be occupied by the device is reduced.

Figure 7:
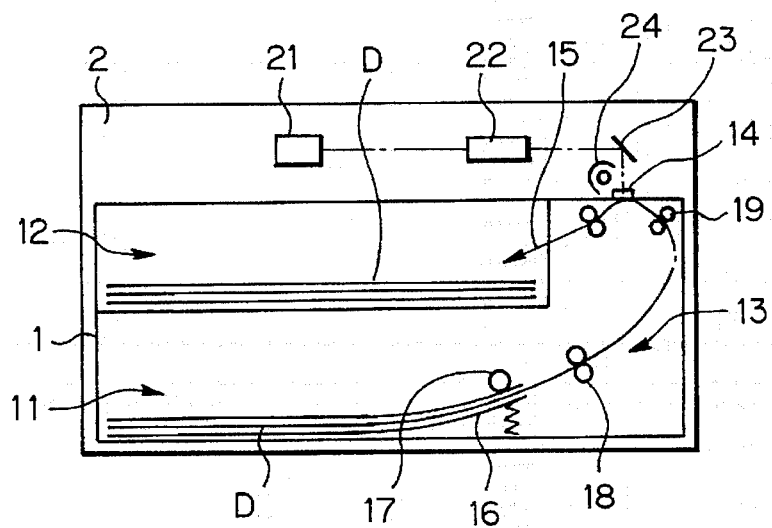
FIG. 7 is a side elevation showing a second embodiment of the present invention.

FIG. 7 shows a second embodiment of the present invention. As shown, this embodiment is essentially similar to the first embodiment except that the position of the document feeding section 11 and that of the document collecting section 12 are replaced with each other. This embodiment, like the above modification, lacks the push-out mechanism.

The section 12 is pulled out integrally with the section 11 and is, therefore, prevented from being pulled out when the document D is being introduced thereinto. This prevents the document D from abutting against and being damaged by the constituents of the device. For this reason, the section 12 has a substantially box-like configuration having a rear wall.

To stack the documents D in the section 11, the operator pulls out the section 11 together with the section 12, moves the section 12 angularly upward to form a space above the section 11, and then lays the documents D on the bottom of the section 11. After all the documents D have been collected in the section 12, the operator pulls out the section 12 together with the section 11, and then takes out the documents D from the section 12.

Figure 11:
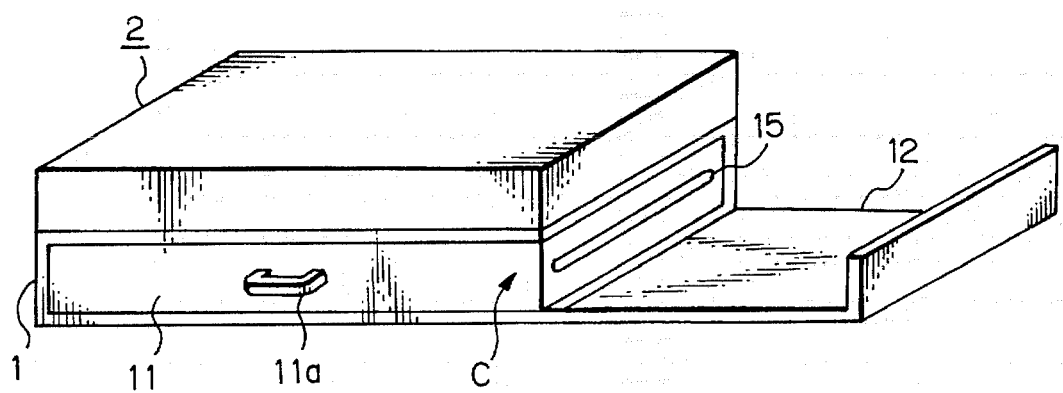
FIGS. 11 and 12 are perspective views each showing the third embodiment in a particular condition.
Figure 12:
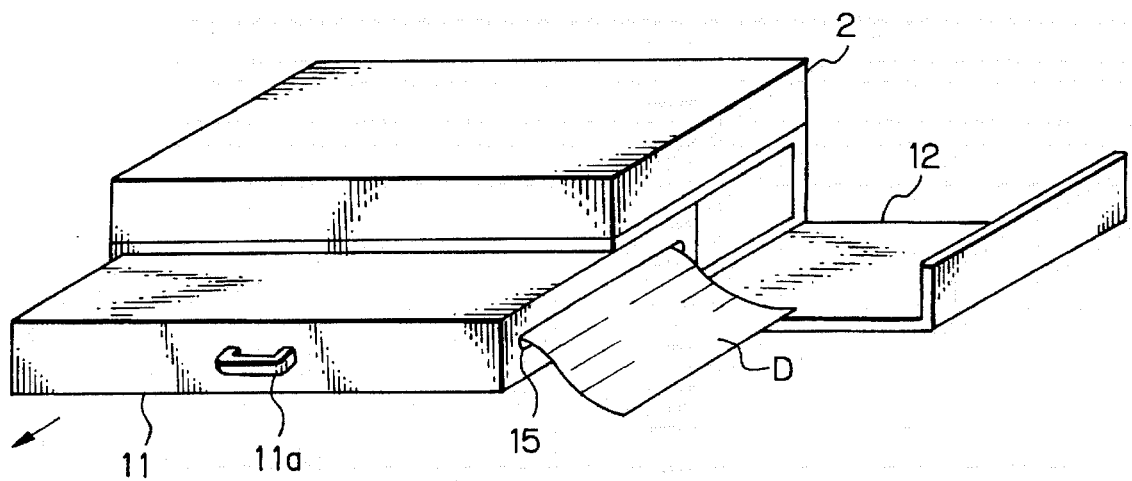
Figure 13:
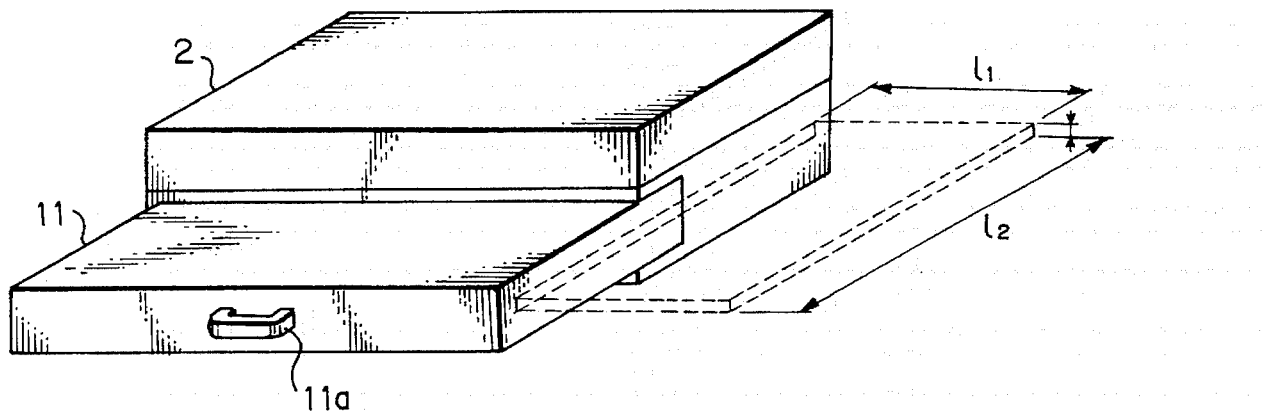
FIG. 13 shows an open space which should be available at the side of an ADF where a document outlet is positioned.

Referring to FIGS. 11–13, a third embodiment of the present invention will be described. Briefly, the embodiment to be described has only the document feeding section 11 and conveyor mechanism 13 in the ADF 1, and has the document collecting section 12 implemented as an open tray and mounted on one side of the device. As shown, the section 11 is configured as a box and provided with the conveyor mechanism 13. Only the section 11 can be pulled out of the device forward, i.e., toward the operator. The section 12 resembles the copy tray of a conventional copier and has the inlet 15 which is, in this case, the outlet of the ADF. The documents D sequentially coming out of the ADF 1 via the outlet 15 are stacked on the section or tray 12. As shown in FIG. 11, the ADF 1 does not have a post at its front corner C close to the outlet 15.

Figure 14:
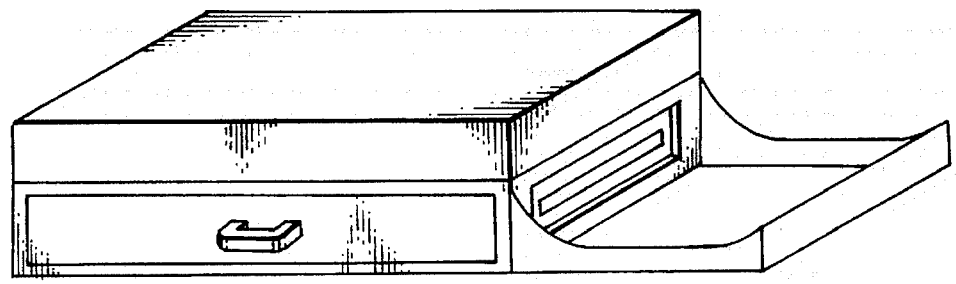
FIG. 14 is a perspective view showing an ADF having a post at one front corner thereof.
Figure 15:
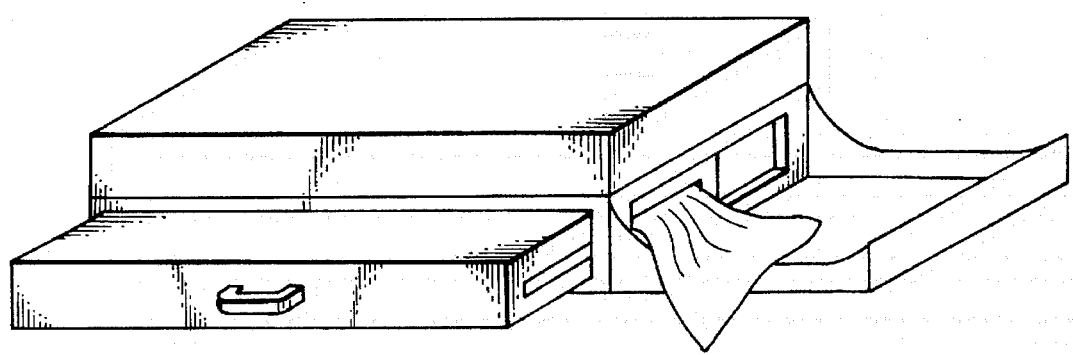
FIG. 15 shows a drawback particular to the ADF of FIG. 14.

In the above configuration, when the section 11 is accidentally pulled out during image reading operation, there is nothing that abuts against and damages the document D being driven out of the section 11 via the outlet 15. As shown in FIG. 13, an open space having particular dimensions is required in which nothing obstructs the document D driven out via the outlet 15. The open space has a dimension $l_1$ corresponding to the maximum document length as measured from the side wall of the ADF 1, a dimension $l_2$ equal to (maximum document width+pull-out length), and a height t equal to the height of the outlet 15. Assume that the ADF 1 has a post at the front corner C, as shown in FIG. 14. Then, when the section 11 is accidentally pulled out during image reading operation, the document B being driven out via the outlet 15 will abut against the post and will be damaged thereby. With such a simple configuration, the embodiment allows the operator to clearly see the documents D stacked on the tray 12 although its frame will be slightly lowered in mechanical strength.

In the foregoing embodiments, the conveyor mechanism 13 is implemented by rollers. Of course, the mechanism 13 may be replaced with, e.g., a mechanism using a belt or a mechanism using the weight of each document D.

Figure 17:
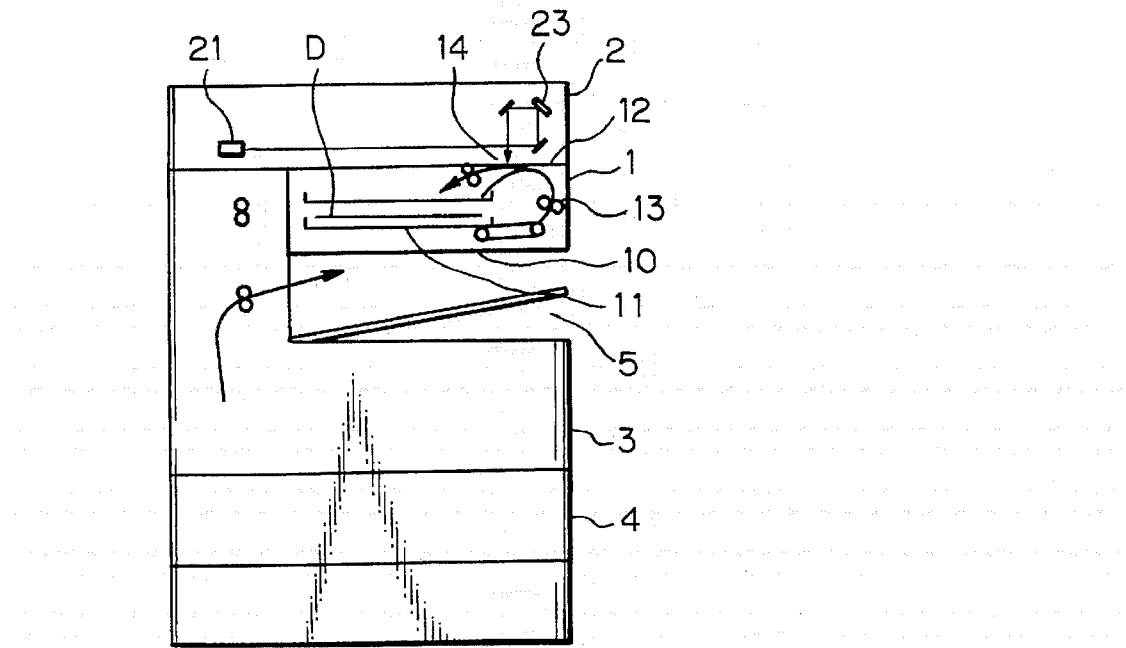
FIG. 17 is a front view showing a fourth embodiment of the present invention.
Figure 18:
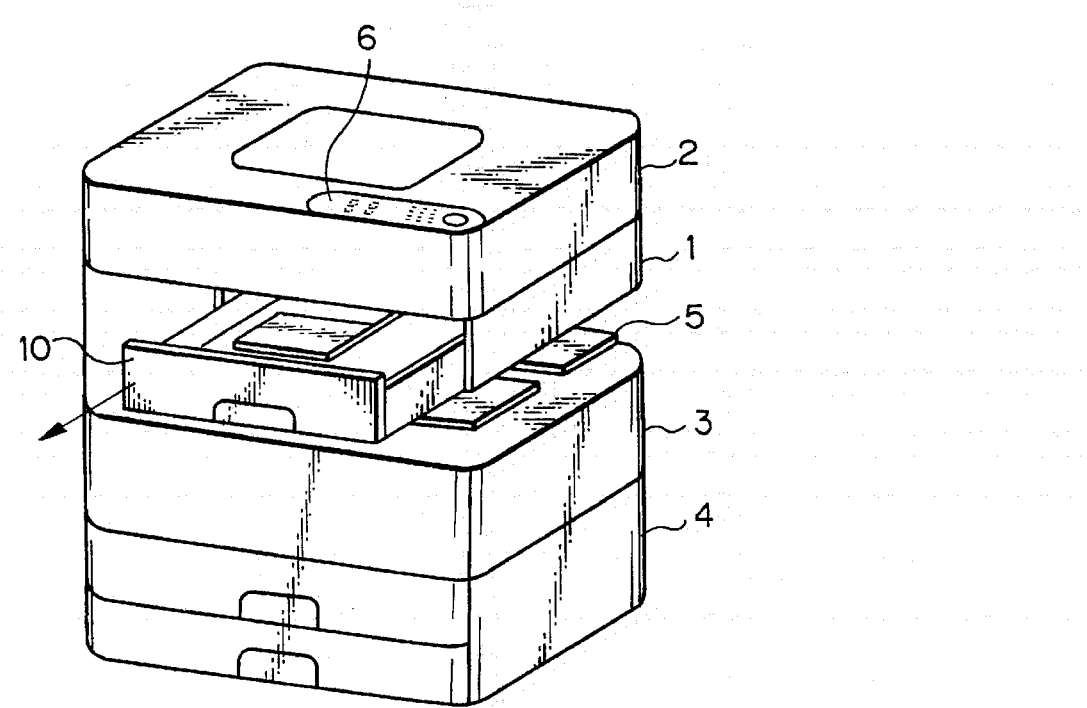
FIG. 18 is a perspective view showing a drawer included in the fourth embodiment in a position pulled out from the apparatus.

A fourth embodiment of the present invention will be described with reference to FIGS. 17 and 18. This embodiment, like the previous embodiments, has the document feeding section 11 in the device and, in addition, obviates wasteful waiting time when a preheat mode is cancelled. As shown, an image recording device 3 records an image representative of the document D read by the scanner 2 on a paper. A paper feeding device 4 feeds paper to the recording device 3 one by one. Papers carrying images thereon are sequentially discharged onto a tray 5. An operation and display panel 6 is mounted on the top of the reading device 2 and allows desired information to be input thereon while displaying the information. A drawer 10 is received in the ADF 1 and can be pulled out, as desired. This embodiment relates to a digital copier having the ADF 1, scanner 2, recording device 3, and paper feeding device 4.

The document feeding section 1 is positioned in the lower portion of the ADF 1 and loaded with the documents D, as in the second embodiment. The documents D are sequentially fed from the section 11 and collected in the collecting section 12 by way of the slit 14 by the conveyor mechanism 13. The section 12 is positioned in the upper portion of the ADF 1. The two sections 11 and 12 are constructed into a single drawer 10. As shown in FIG. 18, the documents D read by the scanner 2 are stacked on the drawer 10 and can be pulled out when the drawer 10 is pulled out. The drawer 10 is also held in the position shown in FIG. 18 when it is to be loaded with the documents D to be read.

Figure 19A:
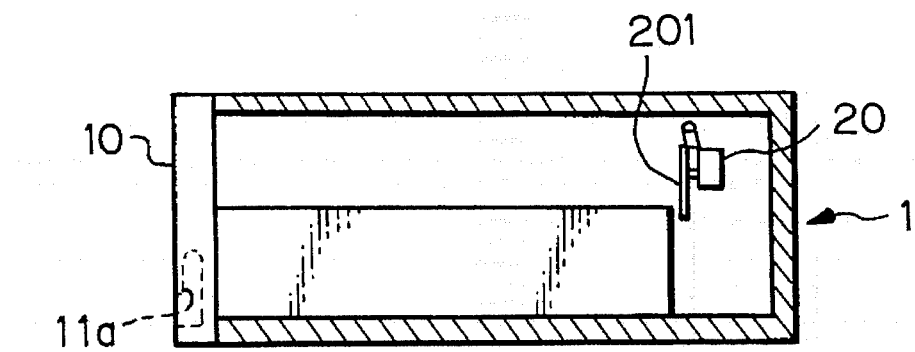
FIGS. 19A and 19B are vertical sections along a direction in which the ADF can be pulled out.
Figure 19B:
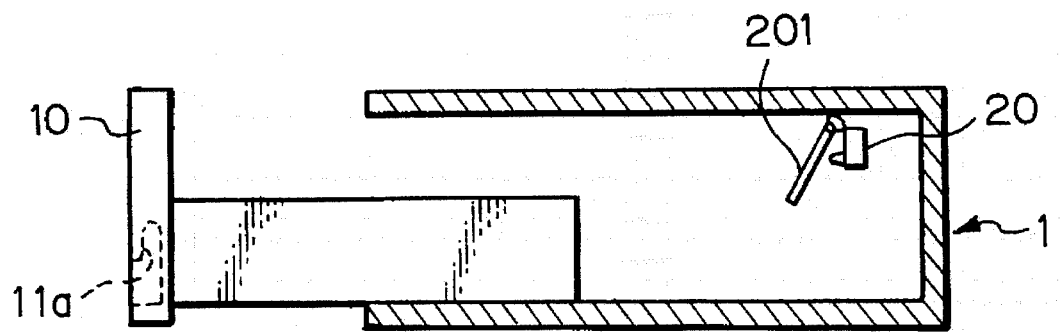

FIG. 19A shows the drawer 10 received in the ADF 1 while FIG. 19B shows it pulled out from the ADF 1. As shown, a switch 20 is disposed in the ADF 1 and adjoins the rear end of the ADF 1. Specifically, the switch 20 is mounted on the underside of the top of the ADF casing. An actuating piece 201 is hinged to the underside of the top of the ADF casing and constantly biased forward by a spring, not shown. In the position shown in FIG. 19A, the piece 201 is pressed by the rear end of the drawer 10 and closes the switch 20. In the position shown in FIG. 19B, the piece 201 is released from the rear end of the drawer 10 and opens the switch 20.

Figure 20:
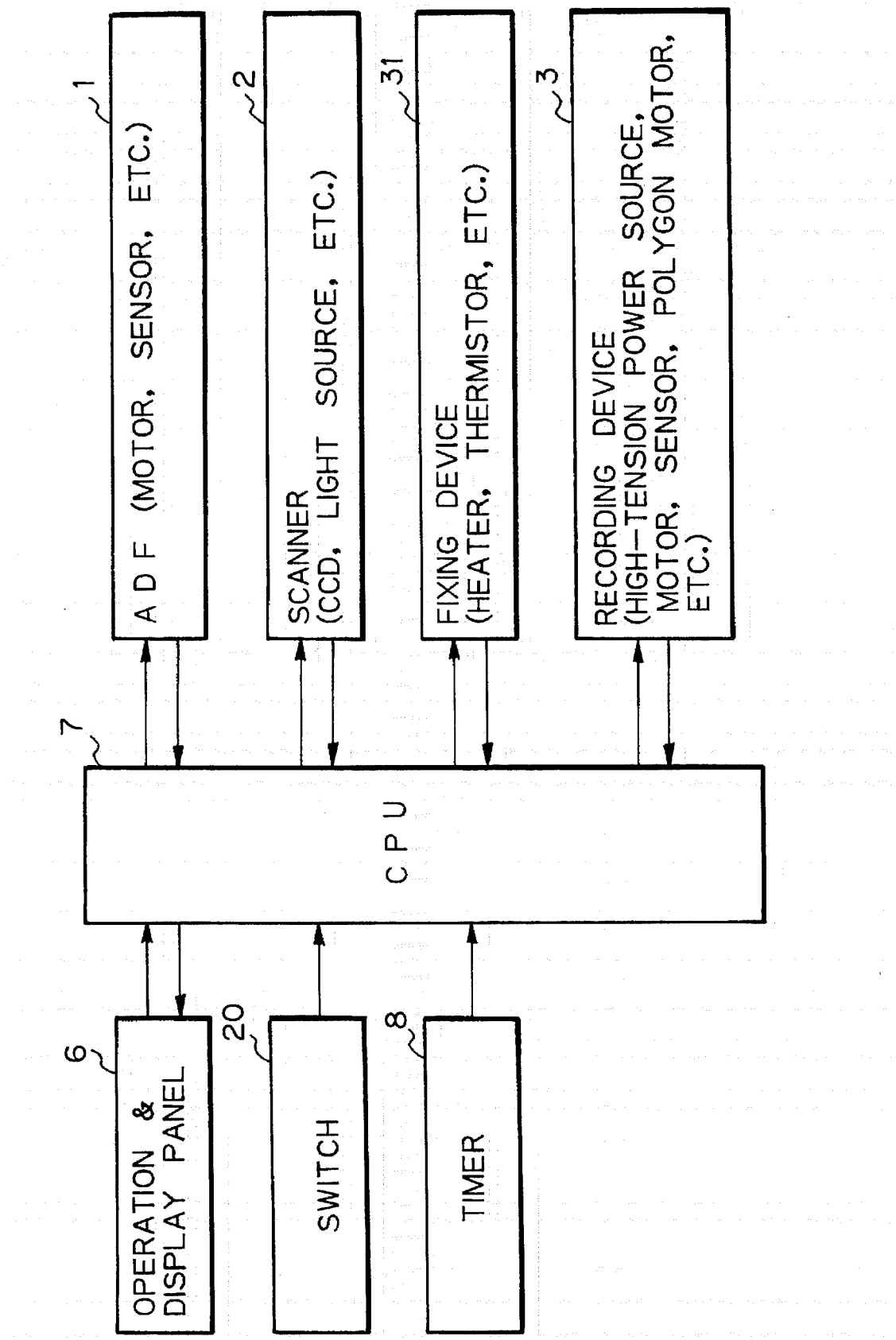
FIG. 20 is a block diagram schematically showing control circuitry included in the fourth embodiment.
Figure 21:
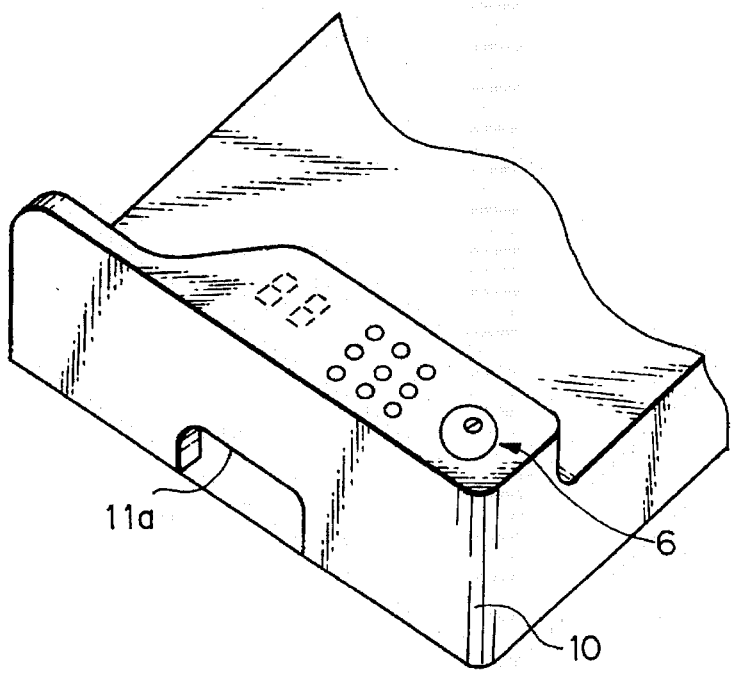
FIG. 21 is a perspective view of a fifth embodiment of the present invention.
Figure 22A:
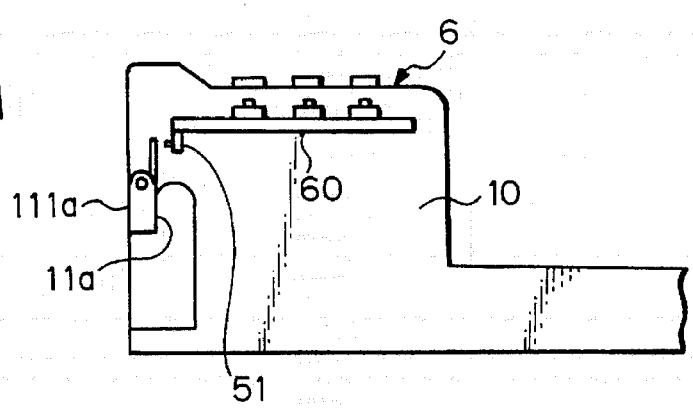
FIGS. 22A and 22B are side elevations showing a pull-out section included in the ADF of the fifth embodiment.
Figure 22B:
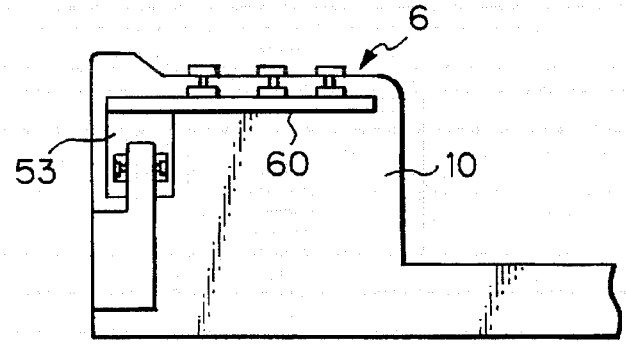

FIG. 20 shows control circuitry included in the embodiment. As shown, the circuitry has a CPU (Central Processing Unit) 7 for controlling the various sections of the copier, a timer for counting time, and a fixing device 31 for fixing images on papers. The CPU 7 controls the image recording device 3, including the ADF 1, scanner 2, and fixing device 31, in response to information entered on the panel 6.

As shown in FIG. 24, when a power switch, not shown, provided on the copier is turned on, the CPU 7 causes the various sections of the copier to start up. For example, the CPU 7 warms up a heat roller included in the fixing device 31, causes a polygon motor included in the scanner 2 to start rotating, and initializes various memories. When the start-up processing is completed, the copier is ready to form an image. When a copy start button, not shown, arranged on the panel 6 is pressed, the copier starts an image forming sequence. The image formation is again followed by the ready state. When a stand-by button also arranged on the panel 6 is pressed or when the ready state lasts for more than a predetermined period of time without the panel 6 being operated, the copier is brought into a stand-by state. In the stand-by state, the CPU 7 interrupts the preheating of the heater, the rotation of the polygon motor, the initialization of a dynamic memory, and other operations, thereby saving power. In this condition, when the drawer 10 is pulled out of the ADF 1, the switch 20 is opened. In response to the resulting output of the switch 20, the CPU 7 causes the various sections of the copier to start up.

With the above procedure, the copier can start up automatically without requiring the operator to cancel the stand-by state via the panel 6, i.e., by using the period of time necessary for the operator to stack the documents D on the section 11 of the drawer 10 pulled out of the ADF 1. When the operator stacks the documents D on the section 11 and pushes the drawer 10 into the ADF 1, the copier is immediately brought into the ready state. In this manner, the embodiment reduces the number of times that the operator manipulates the panel 6, and eliminates or reduces the waiting time necessary for the start-up of the copier.

In the above embodiment, the copier is caused to start up in response to the output of the switch 20 when the drawer 10 is pulled out of the ADF 1. Alternatively, the start-up may be effected when the drawer 10 loaded with the documents D is pushed into the ADF 1. Further, an arrangement may be made such that image formation begins immediately after the start-up processing or if the ready state has already been set up. This causes the copier to start up only when the documents D are present, as determined by a document sensor, and thereby obviates the wasteful start-up of the copier. Moreover, once the operator pushes the drawer 10 loaded with the documents D into the ADF 1, the copier automatically executes an image forming sequence even if the operator leaves it. This further enhances the manipulability of the copier.

A reference will be made to FIGS. 21, 22A, 22B and 23A–23D for describing a fifth embodiment of the present invention and a modification thereof. As shown, a switch 51 is mounted on the drawer 10 and responsive to the operator's hand touching the handle 11a provided on the front of the drawer 10. A movable piece 111a forms a part of the handle 11a and is hinged to the handle 11a. The piece 111a is constantly biased counterclockwise, as viewed in FIGS. 23A and 23B, by a spring, not shown. An actuating piece 52 extends from the hinged portion of the piece 111a. An optical sensor 53 is also responsive to the operator's hand and made up of a light emitting element 53a and a light-sensitive element 53b. The reference numeral 60 designates a printed circuit board included in the panel 6. The switch 51 is mounted on the underside of the front portion of the circuit board 60.

Figure 23A:
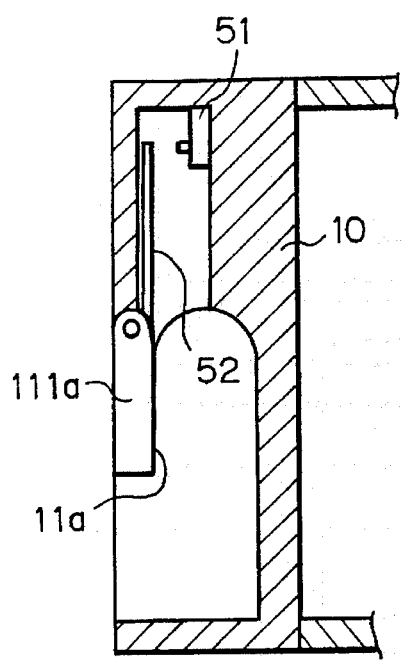
FIGS. 23A–23D are enlarged sections showing the front portion of the pull-out section.
Figure 23B:
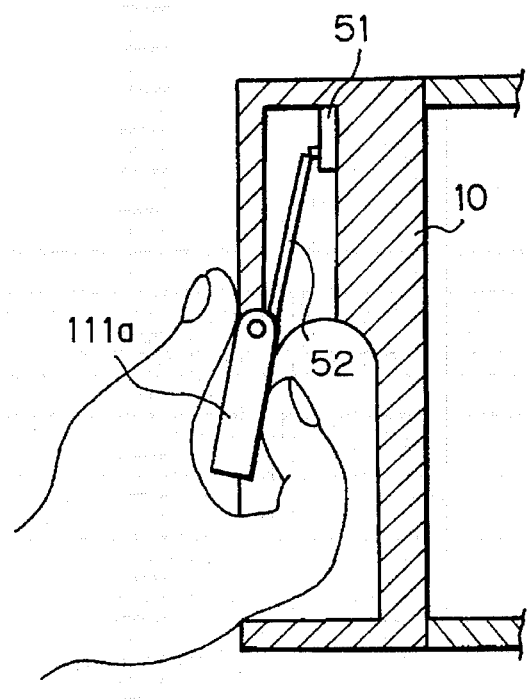

As shown in FIG. 23B, the operator, intending to pull out the drawer 10, touches the movable piece 111a and pulls it forward, i.e., toward the operator. Then, the piece 111a is rotated clockwise against the force of the spring, while causing the piece 52 to rotate in the same direction. As a result, the piece 52 presses the switch 51 and thereby closes it. In this manner, only if the operator touches the handle 11a, the CPU 7 causes the various sections of the copier to start up. This allows the copier to start up at a slightly earlier timing. In addition, because the switch 51 is mounted on the underside of the circuit board 60, extra parts and connecting harness for mounting it are not necessary, so that the production cost is reduced.

Furthermore, the panel 6 is mounted on the top of the front portion of the drawer 10 and is operated after the drawer 10 has been pulled out without exception. Hence, the period of time necessary for the operator to manipulate the panel 6 can be surely used to start up the various sections of the copier. Therefore, the copier can start image formation immediately after the manipulation of the panel 6.

Figure 23C:
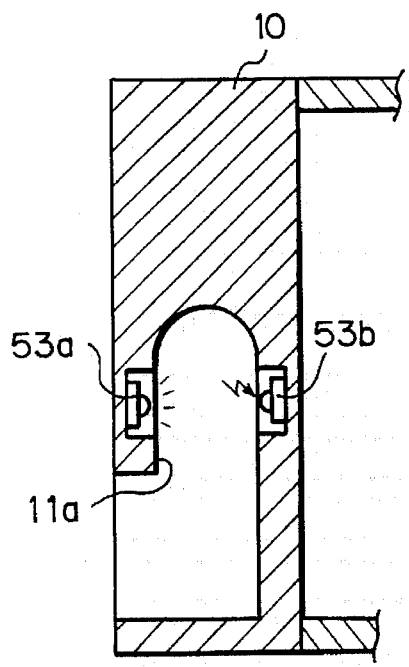
Figure 23D:
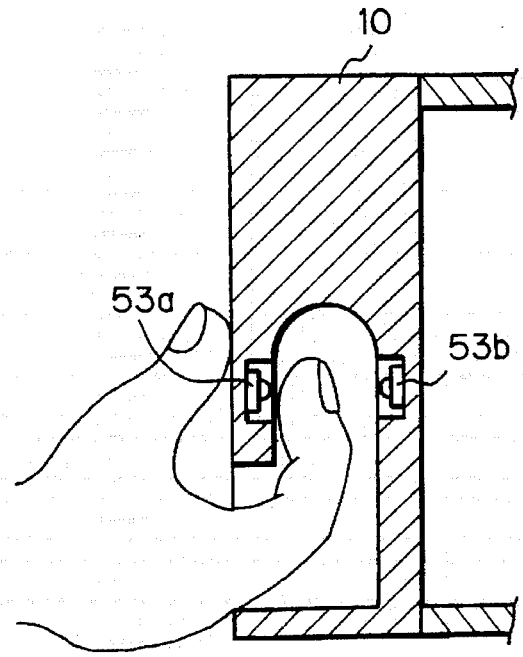

FIG. 23C shows a modification of the above embodiment. As shown, the modification has the optical sensor 53 in place of the switch 51 and also achieves the advantages described above. Specifically, when the operator's hand touches the handle 11a in order to pull out the drawer 10, it intercepts light issuing from the light emitting element 53a toward the light-sensitive element 53b.

In summary, it will be seen that the present invention provides an image forming apparatus having various unprecedented advantages, as enumerated below.

(1) The apparatus allows a document feeding section to be pulled out forward toward the operator and, in addition, prevents a document being conveyed from being accidentally damaged when the feeding section is pulled out.

(2) The lateral dimension of an ADF included in the apparatus can be reduced as far as possible.

(3) Documents which reach a document collecting section are driven forward out of the apparatus body via an opening formed in the front wall of the collecting section. This facilitates the removal of the documents read by a scanner.

(4) A simple construction suffices for the documents to be removed from the collecting section.

(5) The operator's manipulation for cancelling a stand-by mode is not necessary. In addition, a waiting time necessary for the apparatus to start up is eliminated or reduced.

(6) The operator's manipulation for starting an image forming sequence is not necessary. In addition, wasteful start-up is obviated on the basis of the output of a document sensor.

(7) Start-up processing can begin at an earlier timing.

(8) The condition in which the documents are collected in the collecting section can be determined by eye. In addition, a relatively simple construction suffices for the document being conveyed to be prevented from being accidentally damaged when the collecting section is pulled out.

Various modifications will become possible for those skilled in the art after receiving the teachings of the present disclosure without departing from the scope thereof.

What is claimed is:

1. An image reading apparatus comprising:
    a scanner for reading a document image line by line; and
    an automatic document feeder for causing conveying means to sequentially convey documents from a document feeding section to a document collecting section by way of a scanning position, such that an entire conveying path for the document extends from the document feeding section to the document collecting section via the conveying means;
    wherein said document feeding section, said conveying means, and said document collecting section are slidably disposed in said automatic document feeder so as to be outwardly slidable from a front of a body of said automatic document feeder to an outer position with respect to the front of the body, which permits the entire conveying path to be shifted to the outer position.

2. An apparatus as claimed in claim 1, wherein said document feeding section and said document collecting section are positioned one above the other.

3. An apparatus as claimed in claim 1, further comprising:
    mode setting means capable of setting up a stand-by mode for feeding smaller power to a part of said apparatus than during image formation to thereby save power when image formation is interrupted, and for omitting a predetermined operation during image formation; and
    sensing means for determining whether or not a drawer of said automatic document feeder, in which said document feeding section, said conveying means, and said document collecting section are constructed integrally with each other is slid out;
    wherein when said drawer is slid to the outer position, as determined by said sensing means, in said stand-by mode, said stand-by mode is automatically cancelled.

4. An apparatus as claimed in claim 1, further comprising sensing means for determining whether or not a drawer of said automatic document feeder in which said document feeding section, said conveying means, and said document collecting section are constructed integrally with each other is slid out, wherein said apparatus starts image formation immediately after said drawer has been slid out and then slid in.

5. An apparatus as claimed in claim 1, further comprising:
    mode setting means capable of setting up a stand-by mode for feeding smaller power to a part of said apparatus than during image formation to thereby save power when image formation is interrupted, and for omitting a predetermined operation during image formation; and
    sensing means for sensing an operator's hand touching or adjoining a handle provided on a drawer of said automatic document feeder in which said document feeding section, said conveying means, and said document collecting section are constructed integrally with each other;
    wherein when the operator's hand touches or adjoins said handle, as determined by said sensing means, in said stand-by mode, said stand-by mode is automatically cancelled.

6. An image reading apparatus comprising:
    a scanner for reading a document image line by line; and
    an automatic document feeder for causing conveying means to sequentially convey documents from a document feeding section to a document collecting section by way of a scanning position, such that an entire conveying path for a document extends from the document feeding section to the document collecting section via the conveying means;
    wherein said document feeding section, said conveying means, and said document collecting section are slidably disposed in said automatic document feeder so as to be outwardly slidable from a front of a body of said automatic document feeder to an outer position with respect to the front of the body, which permits the entire conveying path to be shifted to the outer position;
    said apparatus further comprising discharging means for discharging the documents collected in said document collecting section to a front of said apparatus via an opening formed on a front wall of said document collecting section.

7. An image reading apparatus comprising:
    a scanner for reading a document image line by line; and
    an automatic document feeder for causing conveying means to sequentially convey documents from a document feeding section to a document collecting section by way of a scanning position, such that an entire conveying path for the document extends from the document feeding section to the document collecting section via the conveying means;
    wherein said document feeding section, said conveying means, and said document collecting section are slidably disposed in said automatic document feeder so as to be outwardly slidable from a front of a body of said automatic document feeder to an outer position with respect to the front of the body, which permits the entire conveying path to be shifted to the outer position, and said document collecting section has a box-like configuration and is slidable from the front of said automatic document feeder independently of said document feeding section and said conveying means.

8. An image reading apparatus comprising:
    a scanner for reading a document image line by line; and
    an automatic document feeder for causing conveying means to sequentially convey documents from a document feeding section to a document collecting section by way of a scanning position;
    wherein said document feeding section and said conveying means are slidably disposed in said automatic document feeder so as to be outwardly slidable from a front of a body of said automatic document feeder, wherein said document collecting section is positioned at a side of said automatic document feeder in close proximity to an opening formed in said side of said automatic document feeder, and wherein no frame members are present at a front of said side of said automatic document feeder.

* * * * *